United States Patent [19]

Johnson

[11] Patent Number: 5,168,900
[45] Date of Patent: Dec. 8, 1992

[54] COMPRESSOR DOUBLE PLATE INLET VALVE

[75] Inventor: Jay T. Johnson, Davidson, N.C.

[73] Assignee: Ingersoll-Rand Company, Woodcliff Lake, N.J.

[21] Appl. No.: 826,550

[22] Filed: Jan. 27, 1992

[51] Int. Cl.⁵ .............................................. F16K 1/22
[52] U.S. Cl. ................................ 137/637.3; 251/212; 251/304
[58] Field of Search ............................. 251/212, 304; 137/637.2, 637.3

[56] References Cited

U.S. PATENT DOCUMENTS

| | | | |
|---|---|---|---|
| 2,209,397 | 7/1940 | Gannestad | 137/637.3 |
| 3,070,345 | 12/1962 | Knecht | 251/212 |
| 3,633,626 | 1/1972 | Zirps et al. | 137/637.3 |
| 3,934,851 | 1/1976 | Illing | 251/212 X |
| 4,253,487 | 3/1981 | Worley et al. | 251/212 X |
| 4,658,857 | 4/1987 | Ayres, Jr. | 251/212 X |

FOREIGN PATENT DOCUMENTS 57-204305 12/1982 Japan.
0729408 3/1980 U.S.S.R. ........................ 137/637.3

Primary Examiner—John Rivell
Attorney, Agent, or Firm—Glenn B. Foster

[57] ABSTRACT

A valve device includes a valve body having an inlet bore formed therein, the valve bore having a bore axis. A first semi-circular plate having a first axis is disposed within said inlet bore. Rotation of the first semi-circular plate about the first axis results in incremental displacement of the first semi-circular plate between an open and a closed position. A second semi-circular plate having a second axis is disposed within said valve bore. The first and the second axis are substantially coaxial wherein rotation of the second semi-circular plate about the second axis results in incremental displacement of the second semi-circular plate between an open and a closed position.

20 Claims, 2 Drawing Sheets

COMPRESSOR DOUBLE PLATE INLET VALVE

BACKGROUND OF THE INVENTION

This invention relates generally to compressors and pumps, and more particularly to inlet valves to be used in conjunction with compressors and pumps.

In present inlet valve configurations, a single unitary plate is used as a valve for a compressor. While this is ideal for simple construction, maintenance and operation, it is often desirable to present more precise inlet flow control than may be practical with a single plate. This precision may be accomplished by a much more complex and expensive actuation device, or a valve as illustrated herein using a simplified actuation device.

In the prior art single plate inlet valves, often excessive pressures must be applied to either the inlet plate or the mechanism required to displace the inlet plate for the larger size inlet valves. This limitation requires that a larger and more complex actuation device, and the associated control elements, be used for this application. For the larger compressors, the force required to move the plate can result in fatigue or damage to the actuation devices and associated couplings or other elements.

The foregoing illustrates limitations known to exist in present inlet valves for compressors. Thus, it is apparent that it would be advantageous to provide a alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a valve device including a valve body having an inlet bore formed therein, the valve bore having a bore axis. A first semi-circular plate having a first axis is disposed within said inlet bore. Rotation of the first semi-circular plate about the first axis results in incremental displacement of the first semi-circular plate between an open and a closed position. A second semi-circular plate having a second axis is disposed within said valve bore. The first and the second axis are substantially coaxial wherein rotation of the second semi-circular plate about the second axis results in incremental displacement of the second semi-circular plate between an open and a closed position.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
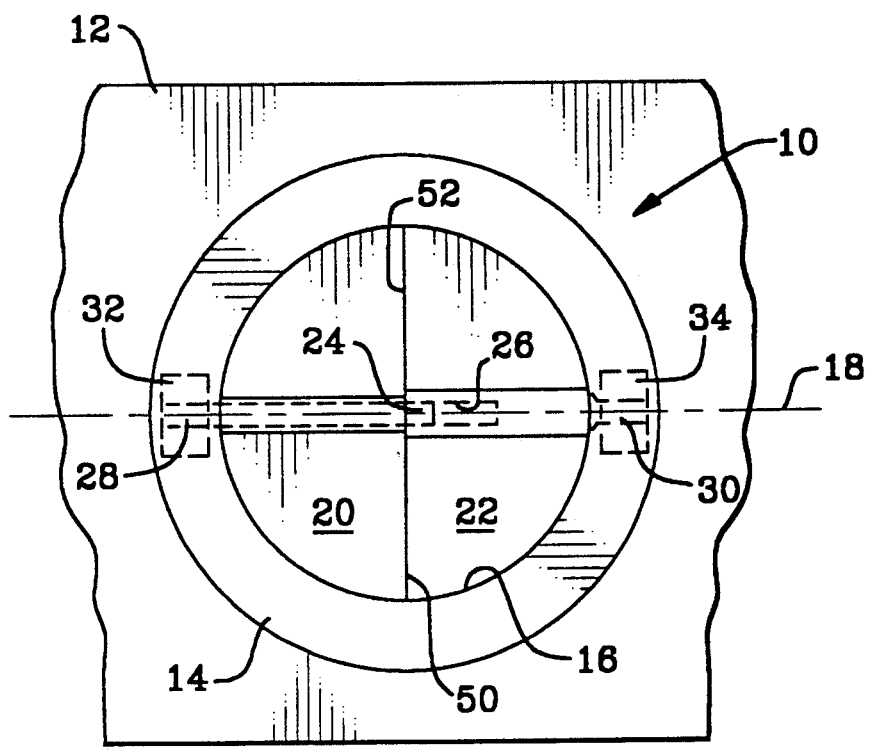
FIG. 1 is a top plan view illustrating an embodiment of double plate inlet valve for a compressor.

FIG. 1 illustrates a top view of an inlet valve 10 of a portion of a compressor 12, the compressor being of any type well known in the art. In this specification, the terms "compressor" and "pump" shall both be all inclusive. The inlet valve 10 includes a valve body 14 with a valve bore 16 formed in the valve body. The valve bore is oriented substantially perpendicular to an axis 18.

A first semi-circular plate 20 and a second semi-circular plate 22 are disposed within the valve bore 16. A male mounting shaft 24 is formed in the first semi-circular plate 20, and partially projects from one surface thereof. A female mounting shaft 26 is formed within the second semi-circular plate 22. In the assembled position, the male mounting shaft 24 extends within the female mounting shaft 26 wherein relative rotation is permitted between the first and the second semi-circular plates 20, 22.

A first pivot element 28, which is coaxial with the male mounting shaft 24, permits relative rotation (about the axis 18) between the first semi-circular plate 20 to the valve bore 16. A second pivot element 30, which is coaxial with the female mounting shaft 26, permits relative rotation (also about the axis 18) between the second semi-circular plate 22 and the valve bore 16. A first actuation device 32 and a second actuation device 34 act to provide relative rotation between the first and second semi-circular plates, respectively, and the valve bore 16. The first and the second actuation devices 32, 34 may be a stepper motor, a hydraulic or pneumatic cylinder, or any other type of incremental actuator well known in the art which provides relative rotational displacement, in controlled increments, between two elements.

Figure 2:
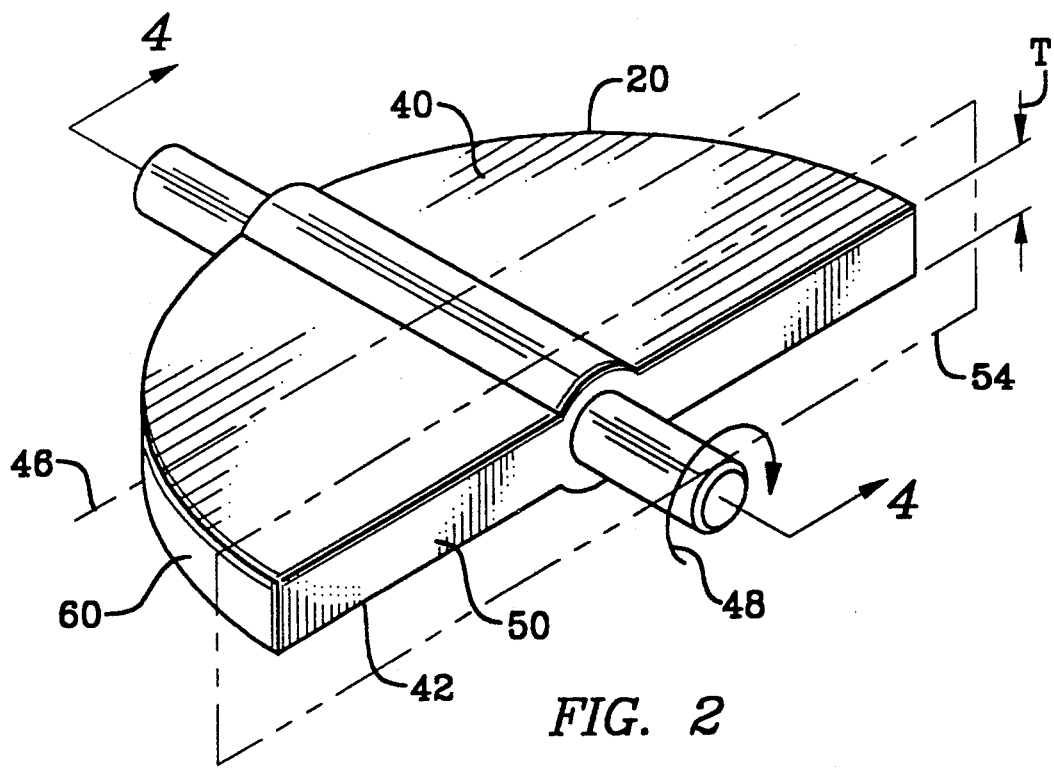
FIG. 2 is a plan view of a semi-circular plate of the type used in the present invention with metal to metal peripheral seal.

Both semi-circular plates 20, 22 are mirror images of each other (excepting the mating shafts 24, 26). FIG. 2, thereby is used to describe the first semi-circular plate 20 with terminology which may be applied to the second semi-circular plate 22. The first semi-circular plate 20 has a thickness T sufficient to resist excessive deformation considering the differences of pressures on opposite lateral sides 40, 42 of the first semi-circular plate 20, which the semi-circular plate is likely to encounter during the lifetime of the compressor 12.

The first semi-circular plate 20 has a plate orientation axis 46 which is along the major length of the semi-circular plate 20. When either semi-circular plate is in an open position (as is the second semi-circular plate in FIG. 3), the plate orientation axis 46 is substantially parallel to the bore axis 18. When either semi-circular plate is in a closed position (as is the first semi-circular plate in FIG. 3), the plate orientation axis 46 is substantially perpendicular to the bore axis 18. Rotation of both the first and the second semi-circular plates 20, 22 from the closed position to the open position is in the same rotational direction 48.

The first and the second semi-circular plates 20, 22 have a first and a second planar peripheral surface 50, 52. Each planar peripheral surface 50, 52 extends around only a portion of the periphery of the respective semi-circular plate 20, 22. Both planar peripheral surfaces are located substantially within a single plane 54, regardless of where the respective semi-circular plate 20, 22 is incrementally displaced between the open and the closed positions.

Figure 4:
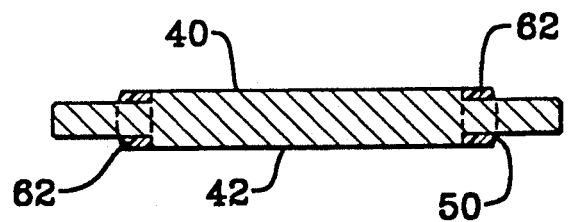
FIG. 4 is a view as taken along section lines 4—4 of FIG. 2 of an alternate embodiment of semi-circular plate incorporating an elastomeric or plastic peripheral seal.

There must be some sealing between both of the semi-circular plates 20, 22, and each of the semi-circular plates and the valve body 14 when the semi-circular plates 20, 22 are in the closed positions. One method to accomplish this is a peripheral metal to metal seal 60 about the entire periphery of the semi-circular plates 20, 22 (illustrated in FIG. 2). The material for the metal seal 60 may be continuous with the material of the respective semi-circular plates, or alternately may be made from a metal strip affixed to the semi-circular plate (not shown) An alternate method to accomplish this seal is providing a plastic or elastomeric seal 62 about the entire periphery of the semi-circular plates 20, 22 as illustrated in FIG. 4. The seal 62 may be round, rectangular or of some other configuration. One peripheral portion of either semi-circular plate 20, 22 may use one type of seal, and another peripheral portion may use another type of seal. Alternately, one entire semi-circular plate could use one type of seal while the other semi-circular plate uses another. Using different types of seals may be desirable considering that different types and amounts of wear may be produced about the periphery of the semi-circular plates 20, 22 depending upon the control system used.

Figure 3:
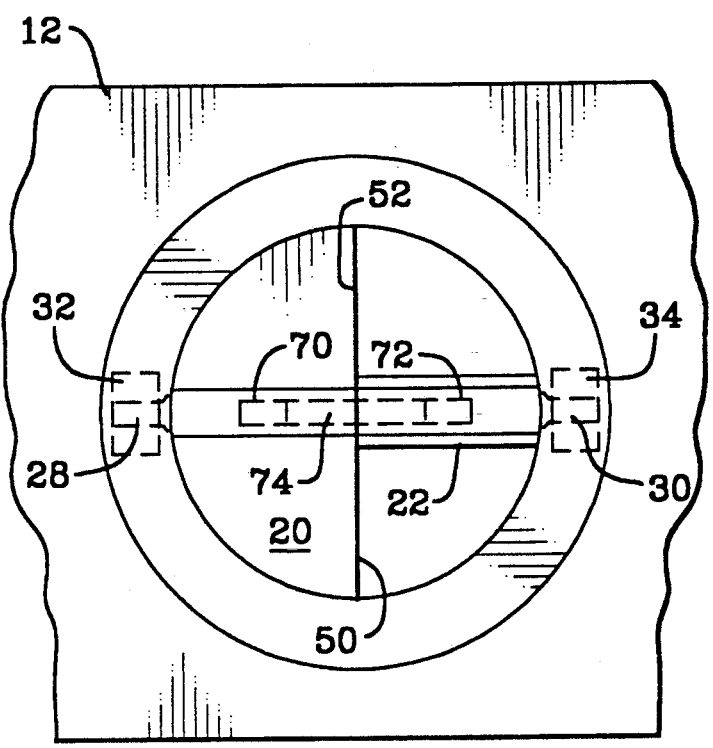
FIG. 3 is a top plan view similar to FIG. 1 illustrating another embodiment of double plate inlet valve for a compressor.

The FIG. 3 embodiment differs from the FIG. 1 embodiment by the substitution of a first coupling portion 70 and a second coupling portion 72 for the male mounting shaft 24 and the female mounting shaft 26. A connecting member 74 extends within the first and the second coupling portions 70, 72 and rotatably couples the first and the second semi-circular plates 20, 22. Actually, any type of coupling structure which permits relative rotation between the first and the second semi-circular plates 20, 22, while limiting relative non-rotational displacement therebetween may be used in the present application and be within the intended scope of the present invention.

The advantages of the present invention is that the flow rate through the inlet valve 10 to the compressor 12 may be regulated more precisely than in the prior single plate inlet valves by an actuation device 32, 34 which is as incrementally precise as if the actuation device used in only a single plate inlet valve. Also, each actuation device and the associated couplings and associated elements which cause displacement between the open and closed position will experience less wear, stress and fatigue than with the single plate inlet valves.

While this invention has been illustrated and described in accordance with a preferred embodiment, it is recognized that other variations and changes may be made therein without departing from the invention as set forth in the claims.

Having described the invention, what is claimed is:

1. A valve apparatus comprising:
a valve body having an inlet bore formed therein, the valve bore having a bore axis;
a first semi-circular plate having a first axis being disposed within said inlet bore, rotation of the first semi-circular plate about the first axis results in incremental displacement between an open and a closed position; and
a second semi-circular plate having a second axis being disposed within said valve bore, the first and the second axis being substantially coaxial wherein rotation of the second semi-circular plate about the second axis results in incremental displacement of the second semi-circular plate between an open and a closed position, rotation of said second semi-circular plate being independent of rotation of said first semi-circular plate.

2. The apparatus as described in claim 1, wherein the first semi-circular plate and the second semi-circular plate have a first planar peripheral surface and a second planar peripheral surface, respectively, wherein the first planar peripheral surface and the second planar peripheral surface are substantially coplanar, regardless of the position of either the first or the second semi-circular plate.

3. The apparatus as described in claim 1, further comprising:
a plate orientation axis defined in both of the semi-circular plates, wherein displacement of either of the semi-circular plates into the open position results in the plate orientation axis is substantially parallel to the bore axis.

4. The apparatus as described in claim 1, further comprising:
a plate orientation axis defined in both of the semi-circular plates, wherein displacement of either of the semi-circular plates into the closed position results in the plate orientation axis being substantially perpendicular to the bore axis.

5. The apparatus as described in claim 1, wherein rotation of either semi-circular plate from the closed to the open positions results in displacement in the same rotational direction.

6. The apparatus as described in claim 1, further comprising:
metal to metal seals defined about a periphery of one of said semi-circular plates.

7. The apparatus as described in claim 1, further comprising:
plastic seals located about the periphery of one of said semi-circular plates.

8. The apparatus as described in claim 1, further comprising:
elastomeric seals located about the periphery of one of said semi-circular plates.

9. A valve apparatus comprising:
a valve body having an inlet bore formed therein, the valve bore having an axis;
a first semi-circular plate being disposed within said valve bore;
a second semi-circular plate being disposed within said valve bore;
a male mounting shaft formed in the first semi-circular plate; and
a female mounting shaft formed in the second semi-circular plate, the male mounting shaft extends partially within said female mounting shaft, the male and the female mounting shafts being disposed substantially perpendicular to said axis wherein rotation of the male mounting shaft rotates the first semi-circular plate incrementally between an open and a closed position, and rotation of the female mounting shaft rotates the second semi-circular plate incrementally between an open and a closed position, rotation of said second semi-circular plate being independent of rotation of said first semi-circular plate.

10. The apparatus as described in claim 9, wherein the first semi-circular plate and the second semi-circular plate have a first planar peripheral surface and a second planar peripheral surface, respectively, wherein the first planar peripheral surface and the second planar peripheral surface both lie substantially in a single plane, regardless of the position which the first or the second semi-circular plate is in.

11. The apparatus as described in claim 9, further comprising:
a plate orientation axis defined in both of the semi-circular plates, wherein displacement of either of the semi-circular plates into the open position results in the plate orientation axis being substantially parallel to the bore axis.

12. The apparatus as described in claim 9, further comprising:
a plate orientation axis defined in both of the semi-circular plates, wherein displacement of either of the semi-circular plates into the closed position results in the plate orientation axis being substantially perpendicular to the bore axis.

13. The apparatus as described in claim 9, wherein rotation of either semi-circular plate from the closed to the open positions is in the same rotational direction.

14. A valve apparatus comprising:
a valve body having an inlet bore formed therein, the valve bore having an axis;
a first semi-circular plate being disposed within said valve bore;
a second semi-circular plate being disposed within said valve bore;
a first coupling portion formed in the first semi-circular plate; and
a second coupling portion formed in the second semi-circular plate, the first coupling portion rotatably couples with said second coupling portion, the first and the second coupling portion being disposed substantially perpendicular to said axis wherein rotation of the first coupling portion incrementally rotates the first semi-circular plate between an open and a closed position, and rotation of the second coupling portion incrementally displaces the second semi-circular plate between an open and a closed position, rotation of said second semi-circular plate being independent of rotation of said first semi-circular plate.

15. The apparatus as described in claim 14, wherein the first semi-circular plate and the second semi-circular plate have a first planar peripheral surface and a second planar peripheral surface, the first planar peripheral surface and the second planar peripheral surface both lie substantially in a single plane, regardless of which position either the first or the second semi-circular plate is in incrementally between and including the open and the closed positions.

16. The apparatus as described in claim 14, further comprising:
a plate orientation axis defined in both of the semi-circular plates, wherein displacement of either of the semi-circular plates into the open position results in the plate orientation axis being parallel to the bore axis.

17. The apparatus as described in claim 14, further comprising:
a plate orientation axis defined in both of the semi-circular plates, wherein displacement of either of the semi-circular plates into the closed position results in the plate orientation axis being substantially perpendicular to the bore axis.

18. An apparatus comprising:
a compressor;
a valve body formed in the compressor having an inlet bore formed therein, the valve bore having a bore axis;
a first semi-circular plate having a first axis being disposed within said inlet valve bore, rotation of the first semi-circular plate about the first axis results in incremental displacement of the first semi-circular plate between an open and a closed position; and
a second semi-circular plate having a second axis being disposed within said inlet valve bore, the first and the second axis being substantially coaxial wherein rotation of the second semi-circular plate about the second axis results in incremental displacement of the second semi-circular plate between an open and a closed position, rotation of said second semi-circular plate being independent of rotation of said first semi-circular plate.

19. The apparatus as described in claim 1, further comprising:
first actuation means for rotating the first semi-circular plate; and
second actuation means, independent of said first actuation means, for rotating the second semi-circular plate.

20. The apparatus as described in claim 18, further comprising:
first actuation means for rotating the first semi-circular plate; and
second actuation means, independent of said first actuation means, for rotating the second semi-circular plate.

* * * * *